United States Patent [19]

Dorrestijn et al.

[11] 4,415,514

[45] Nov. 15, 1983

[54] METHOD FOR THE PREPARATION OF RIGID POLYVINYL CHLORIDE FOAMS

[75] Inventors: Antoon Dorrestijn, Grevenbicht; Pieter J. Lemstra, Brunssum; Lambert H. T. van Unen, Heerlen, all of Netherlands

[73] Assignee: Stamicarbon B.V., Geleen, Netherlands

[21] Appl. No.: 256,667

[22] Filed: Apr. 22, 1981

[30] Foreign Application Priority Data

Apr. 26, 1980 [NL] Netherlands ............... 8002463
Apr. 26, 1980 [NL] Netherlands ............... 8002464

[51] Int. Cl.$^3$ ............................................. B29D 27/00
[52] U.S. Cl. ................................. 264/53; 264/176 R;
264/DIG. 13; 425/209; 425/817 C
[58] Field of Search ............ 264/54, 53, 51, DIG. 13,
264/176 R; 425/209, 817 C

[56] References Cited

U.S. PATENT DOCUMENTS 3,287,477  11/1966  Vesilind ................................. 264/53
3,983,296   9/1976  Purvis et al. ...................... 264/51 X

FOREIGN PATENT DOCUMENTS 652701  12/1964  Belgium .

Primary Examiner—Philip E. Anderson

[57] ABSTRACT

Method for the preparation of rigid polyvinyl chloride foams with a density of below 200 kg/m$^3$, in which method rigid polyvinyl chloride which is provided with a melt-flow improver is foamed with a physical blowing agent via an extruder, in which method in a first step, rigid polyvinyl chloride, together with and preferably mixed with 0.1-15 parts by weight per 100 parts by weight of polyvinyl chloride of a melt-flow improver is fed to an extruder and extruded therewith to form a granulate, this granulate is subsequently impregnated, in a second step, with a physical blowing agent and finally, in a third step, the impregnated granulate is fed, to a foaming extruder in which the granulate is extruded while it passes through a temperature profile in which process the rigid polyvinyl is foamed.

8 Claims, 5 Drawing Figures

METHOD FOR THE PREPARATION OF RIGID POLYVINYL CHLORIDE FOAMS

The invention relates to a method for the preparation of rigid polyvinyl chloride foams with a density of below 200 kg/m$^3$, preferably of between 10 and 100 kg/m$^3$, more specially of between 10 and 50 kg/m$^3$, in which method rigid polyvinyl chloride which is provided with a melt-flow improver is foamed with a physical blowing agent via an extruder.

Such a method is known from the Belgian Pat. No. 879945. This patent specification describes a method for making foamed objects of a resin product consisting of:
(a) 100 parts by weight of a resin based on polyvinyl chloride, preferably a copolymer resin consisting of 60-97 parts by weight of vinyl chloride and 3-40 parts by weight of vinyl acetate, with a mean degree of polymerization of at most 2000 and a pore volume of at most 0.20 ml/g,
(b) at least 1 part by weight of a volatilizable foaming agent, chosen from aliphatic carbonhydrates and aliphatic halogene carbonhydrates with a boiling point of at most 90° C. and impregnated into the resin based onpolyvinylchloride,
(c) 0.5-30 parts by weight of a foam-conditioner, chosen from acrylic resins and resins based on styrene,
(d) 0.01-20 parts by weight of a nucleation agent.

Such a method shows major disadvantages, certainly when starting with a polyvinyl chloride with an intern porosity, which is greater than 0.20 ml/g, to which much common trade-PVC belongs, the impregnation with the physical blowing agent is insufficient so that the resin product becomes practically unfoamable. Also with the particular kinds of polyvinyl chloride to be used according to this Belgian patent specification only a pretty coarse-celled foam of which the cells at their best show a cell-diameter of 500 μm is become.

The method according to the invention does not show these disadvantages. According to the invention such a method is characterized in that, in a first step, rigid polyvinyl chloride, together with and preferably mixed with 0.1-15, preferably 1-10, specially 3-8, parts-by-weight per 100 parts by weight of polyvinyl chloride of a melt-flow improver consisting of one or more compounds chosen from the group formed by copolymers obtained by copolymerizing 10-90% by weight of styrene and/or derivatives of styrene with 90-10% by weight of acrylonitrile and/or methacrylonitrile, polystyrene, copolymers of styrene and up to 40% by weight of other monomers, graft copolymers obtained by polymerizing 50-80 parts by weight of a mixture of monomers consisting of 20-40 parts by weight of acrylonitrile, 60-80 parts by weight of styrene and 0-20 parts by weight of one or more other monomers in presence of 20-50 parts by weight of rubber, poly-ε-caprolactone, polyvinylacetate which may be solvolized, copolymers of vinylacetate and ethylene and specially homo- or copolymers of alkylmethacrylates having an alkyl group of 1-10 carbon atoms and further with the other desired additives, is fed to an extruder and extruded therewith to form a granulate with an average diameter of preferably 0.5-5 mm on account of the impregnability in the next step, under such circumstances that a virtually homogeneous and virtually completely gelled granulate is obtained, this granulate is subsequently impregnated, in a second step, with a physical blowing agent by bringing it together with preferably 25-400 parts by weight of physical blowing agent per 100 parts by weight of polyvinyl chloride in a reactor, bringing it on an elevated pressure of preferably 0.5-5 MPa, specially of 1-2 MPa, and on an elevated temperature of preferably 300-450 K., specially the 325-425 K., and keeping it at these for a residence time depending on the desired degree of impregnation, for instance 0.5-40 hours, in which process the contents of the reactor are preferably kept moving, for instance by stirring, subsequently taking the impregnated granulate out of the reactor and separating it from the physical blowing agent still present as free liquid, for instance by filtration, and finally, in a third step, the impregnated granulate is fed, preferably together with a nucleation agent, to a foaming extruder in which the granulate is extruded while it passes through a temperature profile and that in a manner as to pass a zone with a temperature of 350-400 K., subsequently a zone with a maximum temperature of 400-460 K., to finally leave the extruder via the extruder head where there is a temperature of 340-400 K., in which process the extruded rigid polyvinyl chloride is foamed to a foam with a density of below 200 kg/m$^3$.

The present invention is further illustrated in the drawings which show extruders and the temperature profile therein:

Figure 3:
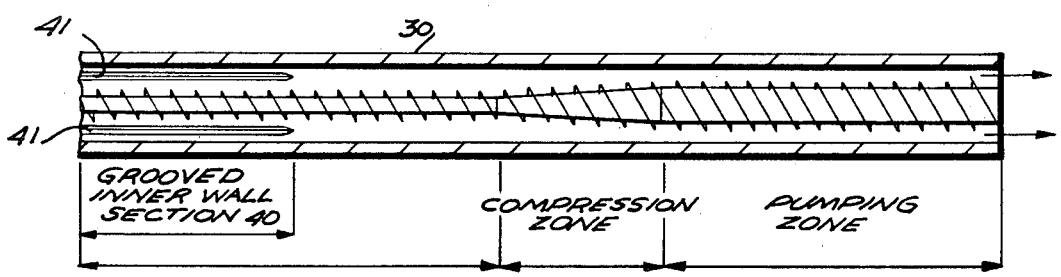
FIG. 3 illustrates in a side view cross section a single screw extruder 30 having a grooved inner cylinder wall section 40 starting from the entry port or ports of the extruder.
Figure 3A:
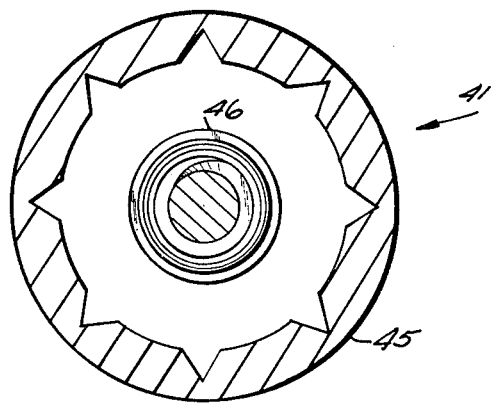

FIG. 3a illustrates in an end view cross section across the grooved inner wall section of a single screw extruder 41 having a grooved inner cylinder wall section 45 starting from the entry port or ports of the extruder and extruder screw 46.

Figure 4:
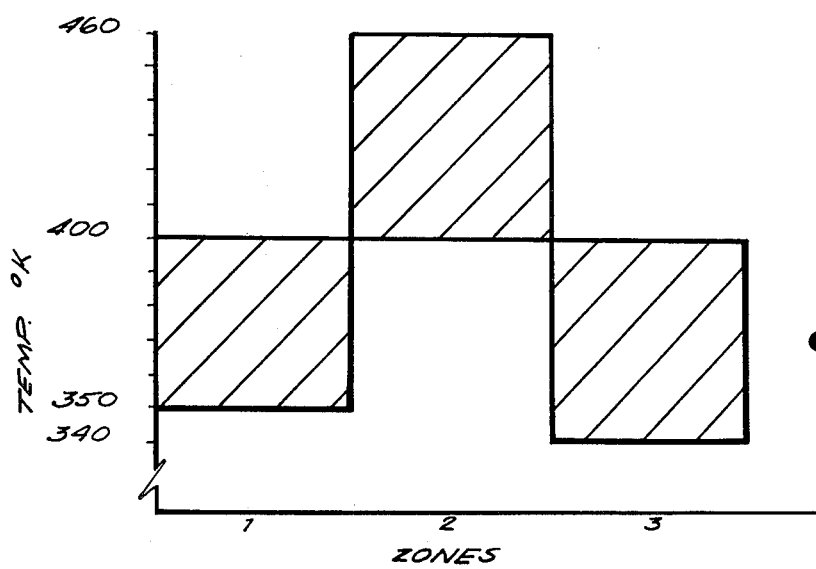

FIG. 4 illustrates in the shaded portions thereof an at least three zone temperature profile.

Rigid polyvinyl chloride is here understood to mean a substantially homopolymer of vinyl chloride with, at most, minor quantities of other monomers polymerized into it, e.g. to 15% by weight. These other monomers may then be polymerized into it by ordinary copolymerization, graft copolymerization and/or block copolymerization. This rigid polyvinyl chloride, has furthermore, a K-value according to Fikentscher of preferably 45-80, more specifically 50-70, and may have been prepared according to any method known per se, e.g. by suspension, emulsion or mass polymerization. It does not or hardly contains softeners.

Figure 2:
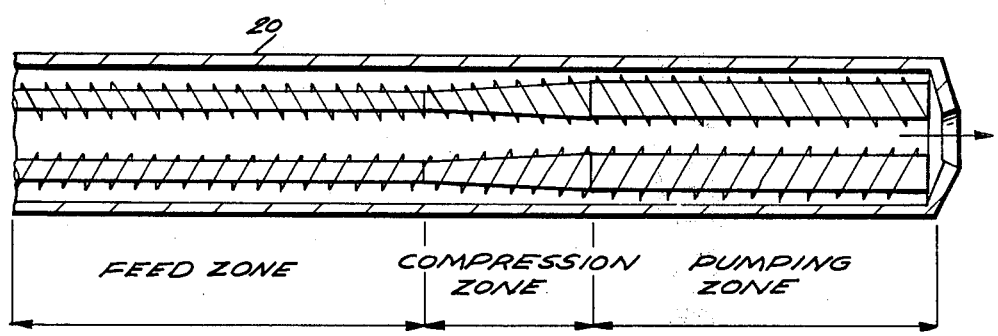
FIG. 2 illustrates in a top view cross section a three-zone double screw extruder (hopper not shown).

For preventing probable escaping of the blowing agent from the impregnated granulate it is advantageous to foam the impregnated granulate via either a double-screw extruder 20 in FIG. 2 or a single-screw extruder (30 in FIG. 3 and 41 in FIG. 3a) of which a part starting at the entrance has a grooved inner wall (40 in FIG. 3 and 45 in FIG. 3a) of the cylinder. The grooved inner wall portion 40 of the cylinder 30 in FIG. 3 has grooves 41. For preventing this escaping of blowing agent it is also advantageous to let the granulate in the foaming extruder pass through a zone, situated directly after the entrance, with a temperature of below 350 K., preferably of between 270 and 300 K. This can be achieved by cooling this zone. Temperatures lower than 270 K. can well be used but are economically not interesting.

According to the invention as melt-flow improver homo- or copolymers of alkylmethacrylates with an alkyl group of 1–10 carbon atoms are used with preference. With these, using the method according to the invention, a foam with a density to far below 200 kg/m$^3$, even down to 10 kg/m$^3$, with a uniform fine-celled cell-structure with closed cells of which at least 95% have a cell-diameter of at most 300 μm, a good dimensional stability at elevated temperature and a fine appearance can be obtained even on the basis of vinyl chloride homopolymer.

According to the invention these homo- or copolymers of an alkyl methacrylate are preferably homo- or copolymers of methyl methacrylate. The copolymers may contain to 25 moles % of an alkyl acrylate with 1–10 carbon atoms in the alkyl group as comonomer. Such copolymers of methacrylates preferably contain alkyl acrylates with 1–4 carbon atoms in the alkyl chain such as methyl acrylate, ethyl acrylate, n-butyl acrylate as comonomer.

The alkyl methacrylates can therefore be copolymerized with alkyl acrylates, also with minor quantities, e.g. to 20% by weight of one or more other comonomers, for instance with styrene, alkyl styrenes, such as α-methyl styrene, acrylonitrile or acrylamide. Preferably polymethyl methacrylate or copolymers of methyl methacrylate with an alkyl acrylate with 1–4 carbon atoms in the alkyl chain, or with styrene, are used.

The methyl methacrylate copolymers preferably contain at least 80% by weight of polymerized methyl methacrylate.

Methyl methacrylate polymers and copolymers are known per se and commercially available so that a more detailed description, particularly of the preparation, may be refrained from. These polymers will hereinafter be referred to, for the purpose of brevity, as PMMA.

The rigid polyvinyl chloride destined as starting material for the method according to the invention may contain the usual additives for polyvinyl chloride.

Thus lubricants or lubricant mixtures in quantities of preferably 0.5–5% by weight may be incorporated in the rigid polyvinyl chloride. Suitable are, for instance, polyethylene wax, calcium stearate, ethylenebis-stearylamide, paraffin and other lubricants known in themselves.

Finely dispersed inorganic fillers and/or pigments can also be incorporated in the rigid polyvinyl chloride in quantities of preferably 1–15% by weight. Such fillers or pigments are, for instance, titanium dioxide, iron oxide, calcium carbonate and silicon dioxide.

Usual stabilizers and other additives usual in themselves may have been added to the rigid polyvinyl chloride in quantities of preferably 0.5–4% by weight. Suitable stabilizers are, for instance, lead compounds, barium cadmium compounds and tin compounds usual as such.

A suitable impact resistance improving agent for the rigid polyvinyl chloride is a copolymer containing at least an alkyl methacrylate with an alkyl group with 1–10 carbon atoms, butadiene 1,3 and styrene and/or α-methyl styrene polymerized into it. Preferably 0.1–15, specifically 1–10, parts by weight of it is used per 100 parts by weight of polyvinyl chloride.

Copolymers containing at least an alkyl methacrylate with an alkyl group with 1–10 carbon atoms, butadiene-1,3 and styrene and/or α-methyl styrene are known.

Preferably these are graft polymers with alkyl methacrylate, specifically methyl methacrylate, grafted on a butadiene styrene polymer, but also with alkyl methacrylate and styrene and/or α-methyl styrene on a butadiene polymer. The butadiene polymer grafted upon may, in the last-mentioned case, be a homo- as well as a copolymer of butadiene-1,3 with at least 50 moles % of butadiene and alkenically unsaturated monomers copolymerizable therewith, such as acrylonitrile, alkyl acrylate, alkyl methacrylate, isoprene or chloroprene. Vinyl aromatic compounds, specifically styrene or α-methyl styrene, have already been mentioned. The graft polymers may contain up to 80% by weight of butadiene. Although graft polymers with small quantities of, for instance, 5 or 10% by weight of butadiene polymer are possible, the polymers for the above-mentioned purpose must contain at least 20% by weight of butadiene polymer. With the graft polymerization, homo-respectively copolymerization of the monomers also takes place in addition to the graft polymerization, so that a polymer mixture is obtained which is referred to, however, for the sake of simplicity, as graft polymers. For the sake of brevity, the polymers mentioned here are hereinafter referred to as MBS.

In the preferred graft polymers with an alkyl methacrylate, preferably methyl methacrylate, and styrene and/or α-methyl styrene grafted on a butadiene polymer, a part of the alkyl methacrylate can be replaced by acrylonitrile. The quantity of alkyl methacrylate should, however, at least be equal to the quantity of acrylonitrile and is preferably at least twice as large. For the sake of simplicity these are deemed, in the framework of this description, also to be covered by the designation of MBS.

Very suitable physical blowing agents are, according to the invention, volatile organic substances with a boiling point at atmospheric pressure of below 400 K. Preferably, according to the invention, one or more fluoro chloro alkanes, more specifically trichloro fluoro methane and or dichloro difluoro methane, are used as physical blowing agents.

Very suitable nucleating agents are very finely dispersed powders of one or more of the compounds, which under the circumstances during the foaming give off gaseous products, such as sodium hydrogen carbonate, calcium carbonate and, specifically, citric acid. Preferably 0.5–2 parts by weight of nucleating agent per 100 parts by weight of polyvinyl chloride is used.

The density of these rigid polyvinyl chloride foams according to the invention can be regulated for instance by regulating the blowing agent content of the rigid polyvinyl chloride to be foamed, for instance by variation of the residence time in the impregnation reactor or by regulating the conditions under which foaming is effected, for instance the extrusion conditions such as melting temperature, melting pressure and/or extension speed.

The invention is further elucidated by means of the following non-restrictive examples and the comparative experiment.

EXAMPLE I

In a high speed mixer 100 parts by weight of rigid polyvinyl chloride with a K-value of 59 is mixed with 6 parts by weight of a PMMA with a glass transition temperature of 378 K. and a viscosity of the solution $\eta_{0.1} = 2.59 \times 10^{-6}$ m$^2$/s measured at 293 K. in 1,2-dichloro ethylene, 1.5 parts by weight of a lead stabilizer, 1.5 parts by weight of a lead salt of a fatty acid and 0.6 parts by weight of polyethylene wax.

Subsequently this mixture is fed to a double-screw extruder with which it is granulated to form a granulate with an average diameter of 2 mm.

The granulate is stirred in an autoclave with 200 parts by weight of trichloro fluoro methane per 100 parts by weight of polyvinyl chloride at 1.6 MPa and 360 K. for 22 hours.

Subsequently the autoclave is cooled, the pressure relieved and the granulate now impregnated with trichloro fluoro methane separated from the remaining trichloro fluoro methane. The granulate proves to be impregnated with 22 parts by weight of trichloro fluoro methane per 100 parts by weight of polyvinyl chloride.

Figure 1:
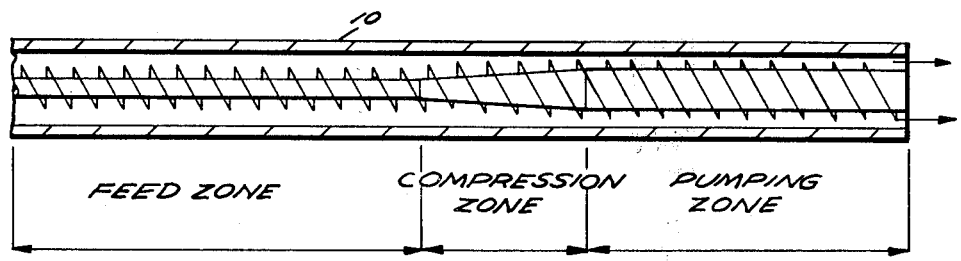
FIG. 1 illustrates in a side-view cross section a single screw extruder having three zones (hopper and die not shown).

This impregnated granulate is mixed together with 1 part by weight of powdery citric acid per 100 parts by weight of polyvinyl chloride. The mixture thus obtained is fed to a single-screw extruder (10 in FIG. 1). In this single-screw extruder the material is brought under pressure, and it passes through a temperature profile (see generally FIG. 4) which runs via about 375 K. and via a maximum of about 415 K., a temperature at which the material behaves as a highly viscous melt, to about 365 K. at the extruder outlet.

The material leaves the extruder via a capillary, after which it foams.

With a screw speed of 1.5 s$^{-1}$ and using a single-screw extruder with:

| | |
|---|---|
| internal cyclinder diameter | = 20 mm |
| L/D | = 26 |
| Feed zone | = 7 D, with screw depth 4.4 mm |
| Compression zone | = 8 D |
| Pumping zone | = 11 D, with screw depth 1.6 mm |
| Capillary diameter | = 2 mm |
| Capillary length | = 8 mm | with a throughput of 1.5 g/s, a foam is obtained with a density of 28 kg/m$^3$ and a uniform, fine-celled cell-structure with closed cells of which 96% have a cell-diameter of at most 300 μm and a fine appearance.

EXAMPLE 2

In a high speed mixer 100 parts by weight of rigid polyvinyl chloride with a K-value of 59 is mixed with 6 parts by weight of the same PMMA, 1.5 parts by weight of the same lead stabilizer, 1.5 parts by weight of the same lead salt of a fatty acid, 0.6 parts by weight of the same polyethylene wax as in example I and with 5 parts by weight of finely dispersed calcium carbonate and 3 parts by weight of an MBS consisting of a graft copolymer of methyl methacrylate and styrene on polybutadiene containing 40% by weight of butadiene units, 17% by weight of methyl methacrylate units and 41% by weight of styrene units, as well as yet 2% by weight of acrylonitrile units.

Subsequently this mixture is fed to a double-screw extruder with which it is granulated to form a granulate with an average diameter of 2 mm.

The granulate is stirred in an autoclave with 200 parts by weight of trichloro fluoro methane per 100 parts by weight of polyvinyl chloride at 1.6 MPa and 360 K. for 22 hours.

Subsequently the autoclave is cooled, the pressure relieved and the granulate now impregnated with trichloro fluoro methane separated from the remaining trichloro fluoro methane. The granulate proves to be impregnated with 25 parts by weight of trichloro fluoro methane per 100 parts by weight of polyvinyl chloride.

This impregnated granulate is fed to the same single-screw extruder as in example I (FIG. 1), in which it passes the same temperature profile undergoing the same processes.

The material leaves the extruder via a capillary, upon which it foams. A foam is obtained with a uniform, fine-celled cell-structure with closed cells and a fine appearance. With a throughput of 1.0 g/s (screw speed 1.0 s$^{-1}$) a foam is thus obtained with a density of 80 kg/m$^3$ (97% of the cells have a cell-diameter of at most 300 μm), with a throughput of 1.5 g/s (screw speed 1.5 s$^{-1}$) a foam with a density of 28 kg/m$^3$ (96% of the cells have a cell-diameter of at most 300 μm) and with a throughput of 2.0 g/s (screw speed 2.0 s$^{-1}$) a foam with a density of 10 kg/m$^3$ (96% of the cells have a cell-diameter of at most 300 μm).

COMPARATIVE EXPERIMENT

In a high-speed mixer, 100 parts by weight of polyvinyl chloride, having a K-value of 59, are mixed with 1.5 parts by weight of the same lead stabilizer, 1.5 parts by weight of the same lead salt of a fatty acid and 0.6 parts by weight of the same polyethylene wax as in Example 1. Consequently, no PMMA is added.

From this mixture it is attempted to prepare a foam in the same way as described in Example 1. However, it is found to be impossible to make a somewhat reasonable foam from such a mixture (without PMMA). The product of the single-screw extruder appears to be virtually unfoamed and to rate an irregular structure.

The invention also comprises objects made wholly or partly from rigid polyvinyl chloride foam made according to the invention as described above.

We claim:

1. Process for preparing polyvinyl chloride foams having densities below 200 kg/m$^3$ by foaming rigid PVC containing a melt-flow improver in the presence of a blowing agent in an extruder comprising the combination of steps of:
   (a) preparing a pre-granulate by mixing rigid PVC with 0.1 parts by weight to 15 parts by weight per 100 parts by weight of PVC of a melt-flow improver, said improver consisting of one or more compounds selected from the group consisting of:
      (i) copolymers obtained by copolymerizing 10 to 90% by weight of styrene and/or derivatives of styrene with 90 to 10% by weight of acrylonitrile and/or methacrylonitrile;
      (ii) polystyrene or copolymers of styrene;
      (iii) graft copolymers obtained by polymerizing 50 to 80 parts by weight of a mixture of monomers consisting of 30 to 40 parts by weight of acrylonitrile and 60 to 80 parts by weight of styrene in the presence of 20 to 50 parts by weight of rubber;
      (iv) poly-ε-caprolactone;
      (v) polyvinylacetate which may be solvolized;
      (vi) homo- or copolymers of alkyl methacrylates having an alkyl group of 1 to 10 carbon atoms;
   (b) feeding said pre-granulate to an extruder;
   (c) extruding said pre-granulate to form a substantially homogeneous and substantially completely gelled granulate particles having an average diameter of 0.5 mm to 5 mm;
   (d) impregnating said granulate with a physical blowing agent by heating said granulate in the presence of about 25 parts by weight to about 400 parts by weight of said physical blowing agent per 100 parts by weight of PVC at a pressure of 0.5 MPa to 5 MPa at 300° K. to 450° K. for about 0.5 hour to 40 hours;

(e) separating said impregnated granulate from the remaining blowing agent;

(f) foam extruding said impregnated granulate to form a rigid PVC foam whereby during extrusion said granulate passes through a temperature profile comprising at least:

(i) a first zone having a temperature of 350° K. to 400° K.;

(ii) a second zone having a temperature of 400° K. to 460° K.; and (iii) a third zone having a temperature of 340° K. to 400° K.

2. Process according to claim 1, wherein in said foam extruding step (f) a double screw extruder is used.

3. Process according to claim 1, wherein in said foam extruding step (f) a single screw extruder having a grooved inner cylinder wall section starting from the entrance of said extruder is used.

4. Process according to claim 1, 2 or 3 wherein in said step (f) but prior to said first zone (i), said mixture is extruded at a temperature below 350° K.

5. Process according to claim 1, 2 or 3 wherein in said step (f) but prior to said first zone (i), said mixture is initially extruded at a temperature between 270° K. and 300° K.

6. Process according to claim 1, 2 or 3 wherein in step (c) 0.5 to 2 parts by weight of said nucleating agent per 100 parts by weight of PVC are added to said separated granulate.

7. Process according to claim 1, 2 or 3 wherein prior to the foam extruding in step f, a nucleating agent consisting of a very finely dispersed powder of one or more compounds, is added to the rigid polyvinyl chloride in an amount of 0.5 to 2 parts by weight of nucleating agent per 100 parts by weight of polyvinyl chloride, wherein said compounds give off gaseous products under foam extrusion conditions.

8. Process according to claim 1, 2 or 3 wherein said blowing agent comprises at least one fluoro chloro alkane.

* * * * *